United States Patent
Cheng

(10) Patent No.: US 11,097,376 B2
(45) Date of Patent: Aug. 24, 2021

(54) APPARATUS FOR TREATING A SURFACE OF A BASE MATERIAL AND A METHOD FOR TREATING A SURFACE OF A BASE MATERIAL

(71) Applicant: MAIN-TYPE TRADING CO., LTD., New Taipei (TW)

(72) Inventor: Ching-Sen Cheng, New Taipei (TW)

(73) Assignee: MAIN-TYPE TRADING CO., LTD., New Taipei (TW)

(*) Notice: Subject to any disclaimer, the term of this patent is extended or adjusted under 35 U.S.C. 154(b) by 257 days.

(21) Appl. No.: 16/233,016

(22) Filed: Dec. 26, 2018

(65) Prior Publication Data

US 2019/0299334 A1     Oct. 3, 2019

Related U.S. Application Data

(60) Provisional application No. 62/652,070, filed on Apr. 3, 2018.

(51) Int. Cl.
*B23K 26/352* (2014.01)
*B23K 26/402* (2014.01)
(Continued)

(52) U.S. Cl.
CPC .......... *B23K 26/352* (2015.10); *B23K 26/032* (2013.01); *B23K 26/048* (2013.01);
(Continued)

(58) Field of Classification Search
CPC .............. B23K 26/352; B23K 26/0622; B23K 26/032; B23K 26/048; B23K 26/16;
(Continued)

(56) References Cited

U.S. PATENT DOCUMENTS 5,273,788 A     12/1993  Yu
5,645,900 A  *  7/1997  Ong ..................... C23C 16/0272
                                                    427/255.7
(Continued)

FOREIGN PATENT DOCUMENTS

CN      1107087      8/1995
JP      H07171689    7/1995
WO      2013-141810  9/2013

OTHER PUBLICATIONS

Office Action of application 108111186 from Taiwan Intellectual Property Office.
(Continued)

*Primary Examiner* — Brian W Jennison
*Assistant Examiner* — Erwin J Wunderlich
(74) *Attorney, Agent, or Firm* — WPAT, P.C., Intellectual Property Attorneys; Anthony King

(57) ABSTRACT

The invention provides an apparatus to radiate a high-powered laser beam and a method for treating a surface of a base material by the high-powered laser beam in order to reduce contamination. Compared to a low-powered laser beam, a high-powered laser beam can be utilized to alleviate the generation of secondary dust ejected from the base material and remove contamination or dust, while forming a layer with lower adhesion attraction. For example, a diamond-like carbon layer can be formed over a carbon-based material layer by laser fusing surface treatment technique.

18 Claims, 12 Drawing Sheets

(51) Int. Cl.
*B23K 26/16* (2006.01)
*B23K 26/0622* (2014.01)
*B23K 26/03* (2006.01)
*B23K 26/04* (2014.01)
*B23K 26/082* (2014.01)
*B23K 26/262* (2014.01)
*G01N 23/00* (2006.01)

(52) U.S. Cl.
CPC .......... *B23K 26/0622* (2015.10); *B23K 26/16* (2013.01); *B23K 26/402* (2013.01); *B23K 26/082* (2015.10); *B23K 26/262* (2015.10); *G01N 23/00* (2013.01)

(58) Field of Classification Search
CPC .. B23K 26/402; B23K 26/082; B23K 26/262; G01N 23/00
See application file for complete search history.

(56) References Cited

U.S. PATENT DOCUMENTS

| | | | | |
|---|---|---|---|---|
| 5,731,046 A * | 3/1998 | Mistry | ............... | B23K 26/0604 427/553 |
| 6,048,588 A * | 4/2000 | Engelsberg | ........... | B08B 7/0042 134/1 |
| 6,312,808 B1 * | 11/2001 | Veerasamy | ............ | B05D 5/083 428/217 |
| 6,338,901 B1 * | 1/2002 | Veerasamy | ............ | B05D 5/083 428/408 |
| 6,475,573 B1 * | 11/2002 | Veerasamy | ............ | B05D 5/083 427/249.7 |
| 8,124,509 B2 * | 2/2012 | Ravi | ................. | H01L 21/02274 438/520 |
| 8,628,624 B2 * | 1/2014 | Turner | ................. | B23K 26/361 134/1 |
| 9,174,304 B2 * | 11/2015 | Minehara | .................. | G21F 9/30 |
| 2003/0164946 A1 * | 9/2003 | Borden | ............. | G01N 21/1717 356/432 |
| 2014/0028996 A1 * | 1/2014 | Liu | ......................... | G01N 21/65 356/51 |
| 2014/0363608 A1 | 12/2014 | Russell-Clarke et al. | | |

OTHER PUBLICATIONS

Office Action of application 2019-066299 from Japanese Patent Office.
Office Action of application 201910257430.4 from China National Intellectual Property Administration.
English abstract translation of Taiwan, Japan and China office action.

* cited by examiner

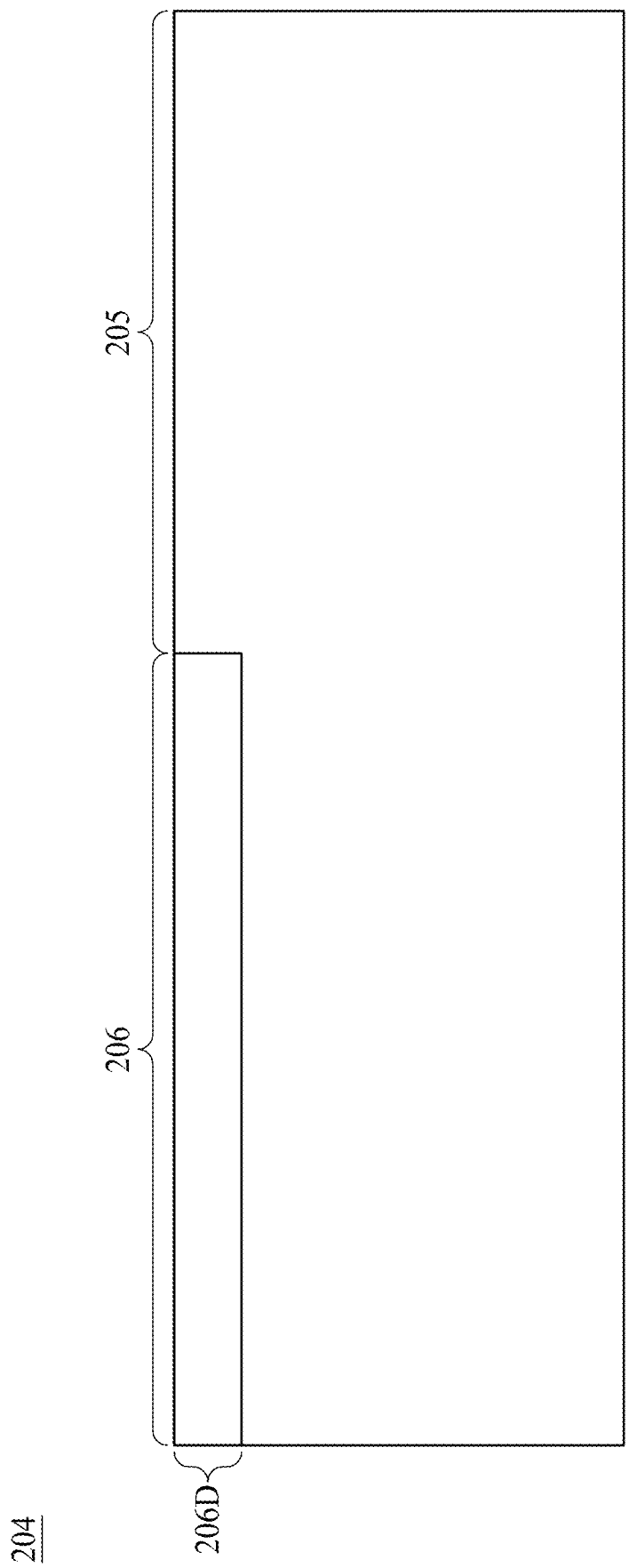

| (Pulse Frequency: 40KHz) | | | | |
|---|---|---|---|---|
| Power \ Scanning Frequency | 20W | 250W | 500W | 750W |
| 50Hz | | | | |
| 100Hz | | | | |
| 150Hz | | | | |

FIG. 3B

| (Scanning Frequency: 150Hz) | | | | |
|---|---|---|---|---|
| Power / Pulse Frequency | 20W | 250W | 500W | 750W |
| 18KHz | | | | |
| 30KHz | | | | |
| 40KHz | | | | |

FIG. 3C

| Power \ Magnification | Base material (Original) | 20W | 250W | 500W | 750W |
|---|---|---|---|---|---|
| 5K |  |  |  |  |  |
| 10K |  |  |  |  |  |
| 50K |  |  |  |  |  |
| 100K |  |  |  |  |  |

APPARATUS FOR TREATING A SURFACE OF A BASE MATERIAL AND A METHOD FOR TREATING A SURFACE OF A BASE MATERIAL

CROSS REFERENCE TO RELATED APPLICATIONS

This application claims the benefit of prior-filed provisional application No. 62/652,070, filed Apr. 3, 2018, which is incorporated by reference in its entirety.

BACKGROUND

In order to remove contaminants, foreign substances, or particles from a surface of a base material, various removal operations have been developed. For example, acid solution may be applied to such a surface in order to react with contaminants including oxides, so that the contaminants may be detached from a surface of a base material to be cleaned. However, as increased environmental and safety awareness leads to tightening of laws and regulations, many effective cleaning chemicals are banned or restricted.

Other cleaning methods may include physical cleaning methods, such as mechanical decontamination, ultrasonic decontamination, and polishing, wherein the contaminants can be removed by mechanical effects such as impact effect or friction effect. However, such methods may induce material loss from or damage to the base material to be cleaned, which may further cause defect issues or reduce the performance of devices fabricated by the base material, such as semiconductor devices, printed substrates, and electrical components. Therefore, improved cleaning methods for cleaning a surface of a base material and an apparatus for cleaning are highly demanded.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 2B is a cross-sectional view of an intermediate product of a base material treated by laser treatment, in accordance with some embodiments of the present disclosure.

FIG. 3B is a tape test experiment result showing a surface of a tape, which has been applied on and subsequently removed from a predetermined surface of a base material after treatment with laser beams at different power levels and different scanning frequencies, in accordance with some embodiments of the present disclosure.

FIG. 3C is a tape test experiment result showing a surface of a tape, which has been applied on and subsequently removed from a predetermined surface of a base material after treatment with laser beams at different power levels and different pulse frequencies, in accordance with some embodiments of the present disclosure.

DETAILED DESCRIPTION

Figure 1:
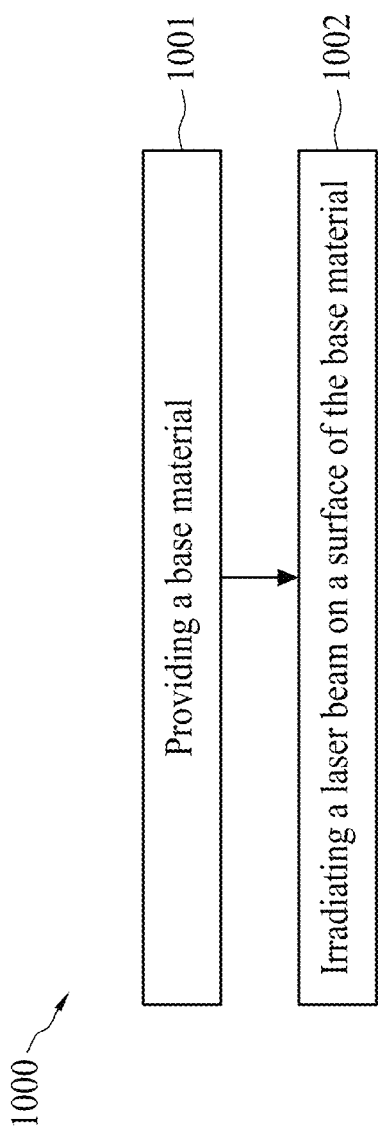
FIG. 1 is a flowchart illustrating a method for treating a surface of a base material, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately," or "about" generally means within a value or range which can be contemplated by people having ordinary skill in the art. Alternatively, the terms "substantially," "approximately," or "about" means within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately," or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise. For example, when used in conjunction with a numerical value, the terms can refer to a range of variation of less than or equal to ±1.0% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.5%.

There are various types of adhering interactions between a contaminant and a surface of a base material, such as covalent bonding, non-covalent bonding, double dipoles, capillarity, hydrogen bonding, electrostatic force, adhesion force, and the like. Among the above-mentioned interactions, capillarity, electrostatic force, and adhesion force between the contaminant and the surface of a base material may be more difficult to treat by virtue of removing the contaminants by breaking or destroying the interactions between the contaminant and the surface of the base material.

Laser technology mainly utilizes photo degradation, light stripping, and/or light vibration principles to gasify, decompose and/or detach the contaminant from the surface of a base material. Laser surface treatment is emerging as a new method of cleaning that offers several advantages, including being adaptive to various types of contaminants, having reduced environmental impact, and alleviating material loss from and/or structural damage to a base material to be cleaned.

Low-power laser cleaning processes can be applied to remove surface contaminants (e.g., oxide substances and/or foreign substances). However, when cleaning certain types of base materials, such as carbon materials, some issues may be incurred by the reduced performance of the low-power laser cleaning process. Specifically, due to the laminated structure of carbon material, secondary carbon dust may be generated due to vibration, secondary machining, rubbing, ejection, or the like during a cleaning process or even during a subsequent fabrication process. The carbon dust may significantly reduce product yield and performance of devices fabricated from carbon materials. Various kinds of products in the field of semiconductor fabrication, microelectronics fabrication, construction, automobile manufacturing, nuclear power plants, medical treatment, and cultural heritage conservation, such as flat panel displays, semiconductor devices, printed substrates, and memory devices, have low tolerance for carbon dust or other foreign substances generated during the cleaning process, which may be induced under a low-power laser cleaning treatment.

In view of the issues induced by the existing cleaning methods, some embodiments of the present disclosure provide an apparatus for treating a surface of a base material utilizing a high-powered laser and methods for treating a surface of a base material by high-powered laser. Specifically, the methods of the present disclosure overcome problems caused when the base material contains contaminant particles (such as foreign particles or dust), the cleaning or physical machining processes generate adhesive contaminant particles, or the base material has a laminated structure. In some embodiments, the base material may include carbon material, such as natural graphite, artificial graphite, carbon fiber, single-walled carbon nanotubes (SWCNTs), multi-walled carbon nanotubes (MWCNTs), graphene, other allotropes of carbon, compounds including carbon, mixtures including carbon, or the combination thereof. The configuration of carbon may include, but is not limited to, block configuration, laminated sheet configuration, or other natural or artificial forms.

Referring to FIG. 1, FIG. 1 shows a flowchart illustrating a method 1000 for treating a surface of a base material, in accordance with some embodiments of the present disclosure. The method 1000 for treating a surface of a base material may include providing a base material (operation 1001) and radiating a laser beam onto a surface of the base material (operation 1002).

Figure 2A:
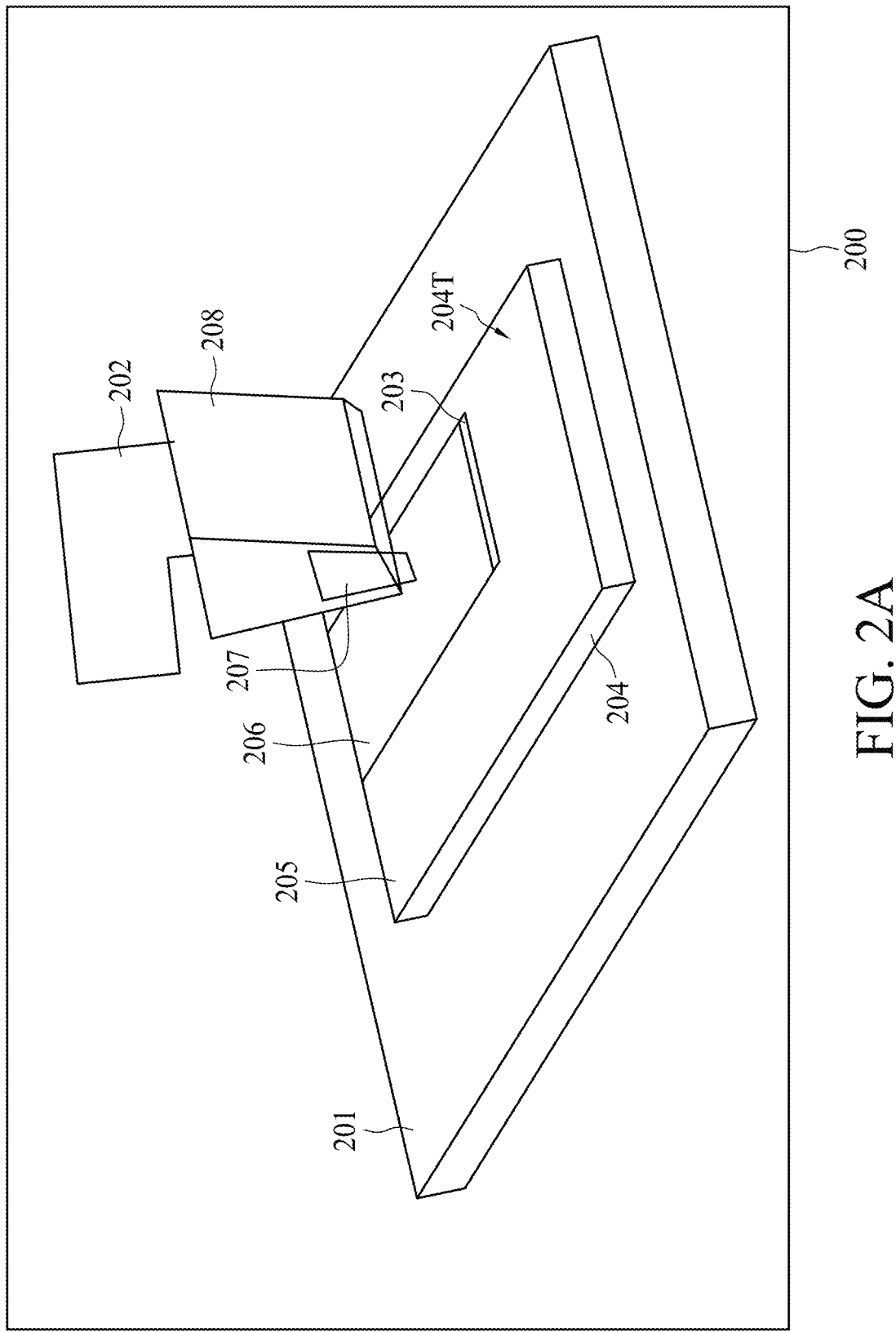
FIG. 2A is a schematic drawing illustrating an apparatus for treating a surface of a base material, in accordance with some embodiments of the present disclosure.

Referring to FIG. 2A, FIG. 2A is a schematic drawing illustrating an apparatus 10a for treating a surface of a base material, in accordance with some embodiments of the present disclosure. The apparatus 10a includes a platform 201 configured to support a base material 204, and a laser source 202 disposed above the platform. The base material 204 is supported by the platform 201, wherein the platform 201 can be fixed or movable. The laser source 202 is configured to perform a laser treatment by radiating a laser beam 203 onto a top surface 204T of the base material 204, thereby causing a portion of the base material 204 to be transformed into a treated portion 206 by the laser treatment. In some embodiments, a predetermined portion of the base material 204 is transformed into the treated portion 206 by the laser treatment. In some embodiments, the entire top surface 204T of the base material 204 is transformed into the treated portion 206 by the laser treatment. An untreated portion 205 of the base material 204 not treated by the laser beam 203 has different properties compared to the treated portion 206 of the base material 204. Specifically, the base material 204 with contaminant particles adhered to the top surface 204T is disposed on the platform 201 and in the chamber 200 for laser treatment, wherein the top surface 204T of the base material 204 faces toward the laser source 202.

Figure 2C:
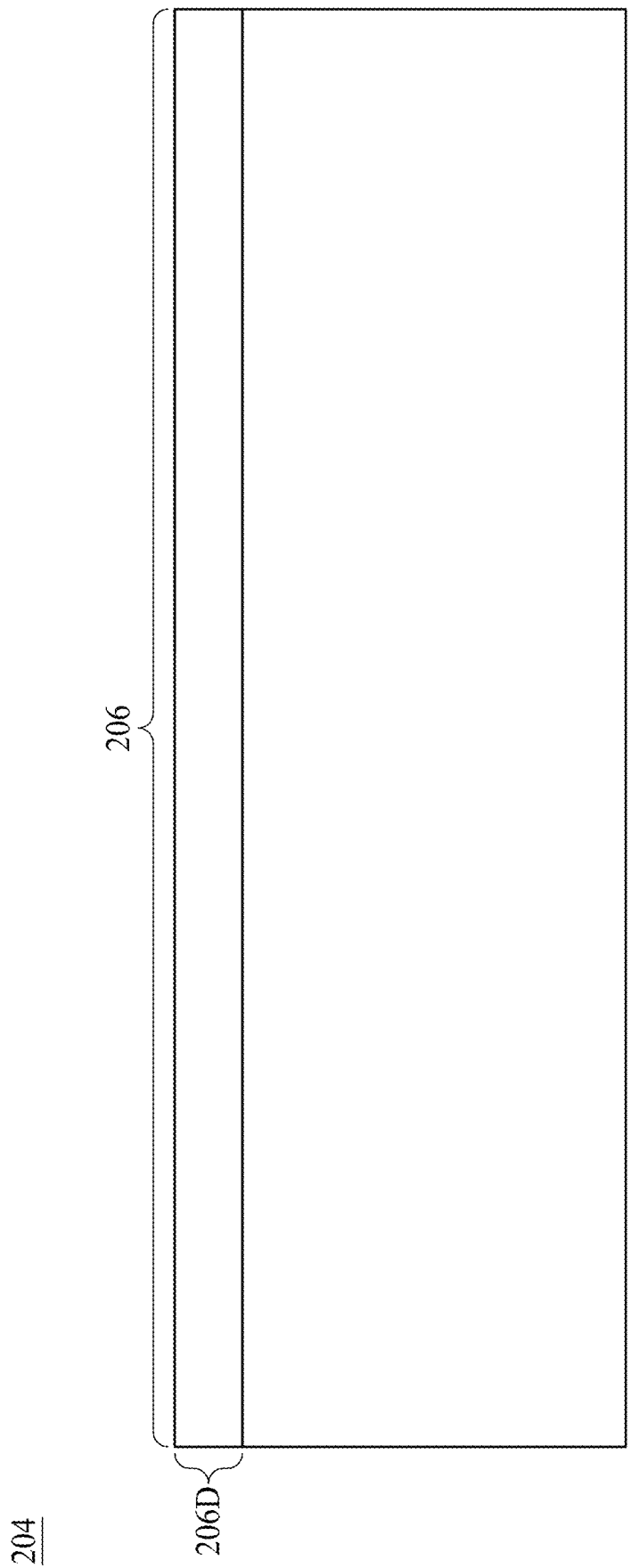
FIG. 2C is a cross-sectional view of a final product of a base material treated by laser treatment, in accordance with some embodiments of the present disclosure.

Referring to FIG. 2A, FIG. 2B, and FIG. 2C, FIG. 2B is a cross-sectional view of an intermediate product of a base material treated by laser treatment, and FIG. 2C is a cross-sectional view of a final product of a base material treated by laser treatment, in accordance with some embodiments of the present disclosure. In some embodiments, the base material 204 includes carbon, and the untreated portion 205 may include a material that is same as the base material 204, while the treated portion 206 may include a diamond-like carbon layer 206D. Alternatively stated, a diamond-like carbon layer 206D is formed on the base material 204 by the laser treatment. In some embodiments, the diamond-like carbon layer 206D partially covers the base material 204, as shown in FIG. 2B. In some embodiments, the diamond-like carbon layer 206I) fully covers the base material 204, as shown in FIG. 2C. As a result of the irradiation with the laser beam 203, the irradiated carbon surface may be locally fused, with the fused surface may form a diamond-like carbon layer 206D after cooling. Diamond-like carbon is a type of amorphous carbon material that exhibits some properties that are similar to those of diamond, wherein the properties may facilitate removal of dust or adhesive contaminant particles from the surface. It is therefore easier to remove dust or adhesive contaminant particles from a surface of the diamond-like carbon layer 206D, and the risk of secondary particles peeling off the diamond-like carbon layer 206I3 may be alleviated due to the stronger structure of the layer. The details will be subsequently discussed in reference to FIG. 4 to FIG. 7.

The laser beam 203 is radiated onto the top surface 204T of the base material 204 in a scanning fashion, wherein a relative movement occurs between the laser source 202 and the base material 204. In some embodiments, the laser source 202 is movable. In some embodiments, the platform 201 supporting the base material 204 is movable. In some other embodiments, both the platform 201 and the laser source 202 are movable. In some other embodiments, the laser source 202 is rotatable. A scanning frequency of the laser beam 203 in a predetermined area may set to be in a range from about 100 Hz to 1,000 Hz, or higher, in order to provide adequate time efficiency. For example, the scanning frequency can be 100 Hz, 150 Hz, 200 Hz, 250 Hz, 300 Hz, 350 Hz, 400 Hz, 450 Hz, 500 Hz, 550 Hz, 600 Hz, 650 Hz, 700 Hz, 750 Hz, 800 Hz, 850 Hz, 900 Hz, 950 Hz, 1,000 Hz, or within any range in between. A scanning direction may be a longitudinal direction, a transverse direction, or a diagonal direction. It is worth noting that scanning can be performed once or multiple times, depending on type and size of the base material 204. A line width of the laser beam 203 may be in a range from about 1 mm to 100 mm, in order to improve time efficiency while avoiding excessive cost.

The apparatus 10a may optionally include a dust collector 208, wherein the dust collector 208 may attract contaminant particles or dust ejected during the laser treatment, so that the amount of the contaminant particles or dust falling back onto the base material 204 can be reduced. In some embodiments, the dust collector 208 may utilize suction, exhaust, electrostatic force, adhesion force, or similar attraction force to collect dust. In some other embodiments, the dust collector 208 can be substituted with elements that can prevent contaminant particles or dust from falling back onto the base material 204, such as a blower, an electrostatic device, or other suitable devices.

The apparatus 10a may optionally include a distance detector 207, wherein the distance detector 207 may detect a distance between the laser source 202 and the top surface 204T of the base material 204 during the laser treatment. In some embodiments, a distance between the laser source 202 and the top surface 204T is in a range from about 1 cm to about 1 m, wherein a distance less than 1 cm may result in damage to the laser source 202 by ejected particles, while a distance greater than 1 m may significantly reduce the accuracy and/or efficiency of the irradiation. In some embodiments, the distance is in a range from about 1 cm to about 6 cm. In some embodiments, the distance is in a range from about 1 cm to about 20 cm. In some embodiments, the distance is in a range from about 6 cm to 100 cm. In some embodiments, the distance detector 207 may include optical devices, such as an infrared device, a set of emitter and receiver, or the like. In some embodiments, a greater distance between the laser source 202 and the top surface 204T may require greater power to compensate for the loss of energy due to the greater distance.

In some embodiments, in order to improve the performance of the laser treatment, the laser treatment may be performed in a chamber 200, wherein the chamber 200 may be a vacuum environment or a low-pressure environment. Such chamber 200 may provide an isolated environment as defects caused by exposure to air (due to contaminants such as particles or moisture) may be alleviated.

Figure 3A:
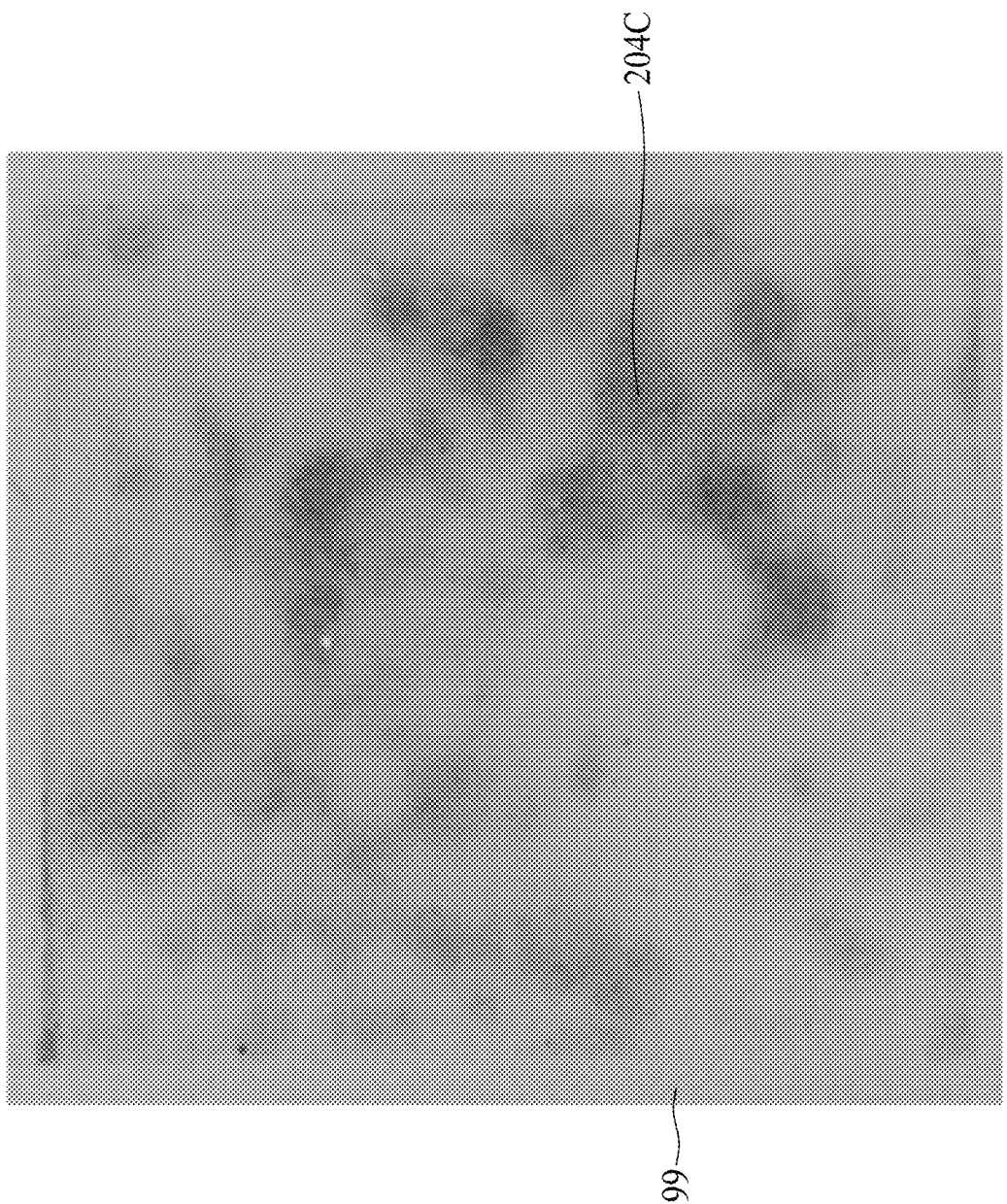
FIG. 3A is a tape test experiment result showing an enlarged image of a surface of a tape, which has been applied on and subsequently removed from a predetermined surface of a base material prior to laser treatment, in accordance with some embodiments of the present disclosure.

Referring to FIG. 2A and FIG. 3A, FIG. 3A is a tape test experiment result showing a surface of a tape, which has been applied on and subsequently removed from a predetermined surface of a base material prior to laser treatment, in accordance with some embodiments of the present disclosure. A tape test can be performed to evaluate adhesion force between contaminant particles 204C and the top surface 204T of the base material 204. During a tape test, a tape 99 is attached to a predetermined position on the top surface 204T of the base material 204. A force can be applied on the tape 99 to flatten and smooth out the tape 99, wherein the force can be applied by a tester's finger, an eraser, or the like. Subsequently, the tape 99 is removed at an angle proximate to 180 degree within 90 seconds after applying the force on the tape 99, and the amount of contaminant particles 204C attached to the tape 99 (which is removed from the top surface 204T of the base material 204) can be observed. An amount or a density of contaminant particles 204C adhered on the surface of the tape 99 is positively correlated to an amount or a density of contaminant particles 204C adhered on the top surface 204T of the base material 204 prior to the tape test, and is negatively correlated to adhesion force between contaminant particles 204C and the top surface 204T of the base material 204.

In some embodiments, the tape 99 utilized in the tape test is a square-shape pressure-sensitive tape having a side length of about 1.0 inch, wherein the tape 99 may be transparent or semitransparent pressure-sensitive tape with an adhesive peel strength in a range from about 6.34 N/cm (58 oz/inch) to about 7.00 N/cm (64 oz/inch). In addition, a peripheral area of the tape 99 may be removed before the tape 99 is attached to the top surface 204T of the base material 204. For example, a size of the tape 99 is reduced to a square shape having a width of 1 cm on each side. However, it should be noted that the size and the type of the tape 99 may be adjusted according to a property of the base material 204. Similar tape tests can also be performed herein.

A result of a tape test experiment performed on the top surface 204T of the base material 204 prior to laser treatment is shown in FIG. 3A, wherein the result can be a comparison group for assessing the change of properties between the top surface 204T of the base material 204 prior to and subsequent to laser treatment.

Referring to FIG. 2A, FIG. 3A and FIG. 3B, FIG. 3B is a tape test experiment result showing a surface of a tape, which has been applied on and subsequently removed from a predetermined surface of a base material after treatment with laser beams at different power levels and different scanning frequencies, in accordance with some embodiments of the present disclosure. In order to obtain a desirable range of the power of the laser beam 203, experimental tape test samples of the base material 204 treated at different power levels and scanning frequencies of the laser beam 203 during laser treatment are obtained (with a pulse frequency of the laser beam 203 exemplarily set at 40 KHz for illustration). A density of the darker portions illustrated in the images in FIG. 3A and FIG. 3B indicates the density of contamination or dust adhered to a surface of the tape 99. As presented in the table of FIG. 3B, after the laser treatment, the amount (or density) of contamination or dust adhered to the surface of the tape 99 is significantly reduced, compared to the amount of contamination or dust adhered to a surface of the tape 99 prior to laser treatment as illustrated in FIG. 3A. A power of the laser beam 203 above 100 W may remove a majority of the contamination or dust from the base material 204 during the laser treatment. In some embodiments, a power of the laser beam 203 above 250 W provides a more effective removal of a majority of the contamination or dust from the top surface 204T during the laser treatment. In some embodiments, the power of the laser beam 203 may be in a range from about 100 W to about 1,000 W, wherein a power over 1,000 W may induce greater cost due to the greater consumption of power or stricter requirement of protection and/or cooling system. The power of the laser beam 203 can be set to be within a range of about 100 W to about 1,000 W, such as 100 W, 150 W, 200 W, 250 W, 300 W, 350 W, 400 W, 450 W, 500 W, 550 W, 600 W, 650 W, 700 W, 750 W, 800 W, 850 W, 900 W, 950 W, or 1000 W. An increment between each power level can be 200 W, 100 W, 50 W, 10 W, 5 W, 1 W, 0.1 W, 0.01 W, or even continuous. The limitation range can also be set to be within any range within about 100 W to about 1,000 W or within any range between two of the above-mentioned power levels, for example, within a range from about 250 W to about 750 W, within a range from about 250 W to about 500 W, or within a range from about 500 W to about 750 W. In some embodiments, more than one laser treatment can be performed on a given base material 204, as different power levels of the laser beam 203 can be sequentially radiated on the same base material 204. In some embodiments, different power levels of the laser beam 203 can be applied to different regions of the base material 204.

Referring to FIG. 2A, FIG. 3A and FIG. 3C, FIG. 3C is a tape test experiment result showing a surface of a tape, which has been applied on and subsequently removed from a predetermined surface of a base material after treatment with laser beams at different power levels and different pulse frequencies, in accordance with some embodiments of the present disclosure. Alternatively, a desirable range of the power of the laser beam 203 can be obtained via experimental samples of the base material 204 treated at different power levels and pulse frequencies of the laser beam 203 during laser treatment (with a scanning frequency of the laser beam 203 exemplarily set at 150 Hz for illustration). Similarly, a density of darker portions illustrated in the images in FIG. 3A and FIG. 3C indicates the density of contamination or dust adhered to a surface of the tape 99. As presented in the table of FIG. 3C, after the laser treatment, the amount (or density) of contamination or dust adhered to the surface of the tape 99 is significantly reduced, compared to the contamination or dust adhered to a surface of the tape 99 prior to laser treatment as illustrated in FIG. 3A. In some embodiments, a laser beam 203 with a power above 100 W may remove a majority of the contamination or dust from the top surface 204T during the laser treatment. In some embodiments, a laser beam 203 with a power above 250 W may more effectively remove a majority of the contamination or dust from the top surface 204T during the laser treatment. In some embodiments, the power of the laser beam 203 may be in a range from about 100 W to about 1,000 W, wherein a power over 1,000 W may induce greater cost due to the greater consumption of power or stricter requirements of protection and/or cooling system, as previously discussed in reference to FIG. 3B.

The experiment discussed in reference to FIG. 3A, FIG. 3B, and FIG. 3C illustrates an adhesive attraction between the top surface 204T (shown in FIG. 2A) and the contamination or dust being reduced by the laser treatment. The treated portion 206 (which is treated by the laser beam 203) of the base material 204 includes a material with lower adhesive attraction, such as a diamond-like carbon layer 206D (shown in FIG. 2B and FIG. 2C) on the top surface 204T. The treated portion 206 formed by laser treatment may provide a smoother surface with a lower adhesive attraction, which reduces the amount of contamination or dust adhering to the top surface 204T after the base material 204 is subjected to the laser treatment. According to the experimental results discussed in reference to FIG. 3B and FIG. 3C, in some embodiments, a laser beam 203 with a power above 100W (or above 250W in some embodiments) may reduce an adhesive attraction of the top surface 204T (e.g., effectively forming a diamond-like carbon layer 206D), thus facilitating the removal of contamination or dust from the top surface 204T of the base material 204. The high-powered laser beam 203 can operate when a pulse frequency of the laser beam 203 is in a range from about 10 KHz to about 50 KHz and a scanning frequency of the laser beam 203 is in a range from about 100 Hz to about 1,000 Hz.

Figure 4:
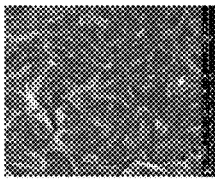
FIG. 4 is an experiment result showing enlarged scanning electron microscope (SEM) images at different levels of magnification of a surface of a base material subsequent to laser treatment with laser beams at different power levels, in accordance with some embodiments of the present disclosure.
Figure 4:
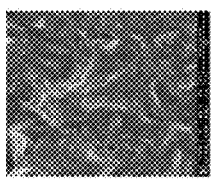
Figure 4:
Figure 4:
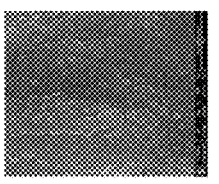
Figure 4:
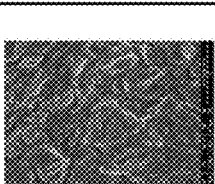
Figure 4:
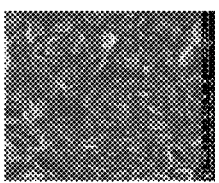
Figure 4:
Figure 4:
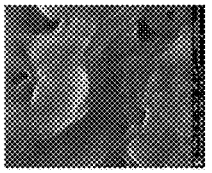
Figure 4:
Figure 4:
Figure 4:
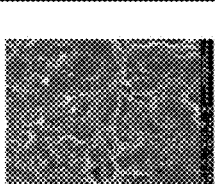
Figure 4:
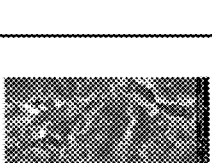
Figure 4:
Figure 4:
Figure 4:
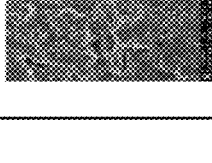
Figure 4:
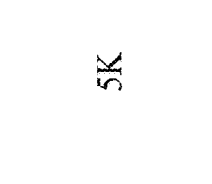
Figure 4:
Figure 4:
Figure 4:
Figure 4:
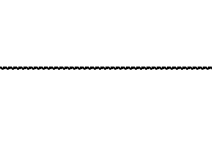

Referring to FIG. 4, FIG. 4 is an experiment result showing enlarged scanning electron microscope (SEM) images at different levels of magnification of a surface of a base material after treatment with laser beams at different power levels, in accordance with some embodiments of the present disclosure. A roughness or smoothness of the treated portion 206 subjected to the laser treatment at different power levels of the laser beam 203, which may be observed under proper magnification with a scanning electron microscope (SEM), is presented in FIG. 4. It can be observed that the top surface 204T treated by a laser beam 203 having a power of at least 100 W (or at least 250 W in some embodiments) may form a treated portion 206 having a surface that is within an acceptable range of roughness/smoothness. Note that the images of exemplary samples of treated portions 206 provided in FIG. 4 include diamond-like carbon. Specifically, the diamond-like carbon layer can be an amorphous structure lacking grains, which constitutes a smoother surface with reduced friction. Therefore, the laser treatment can reduce the amount of contamination or dust adhering to the top surface 204T.

Figure 5:
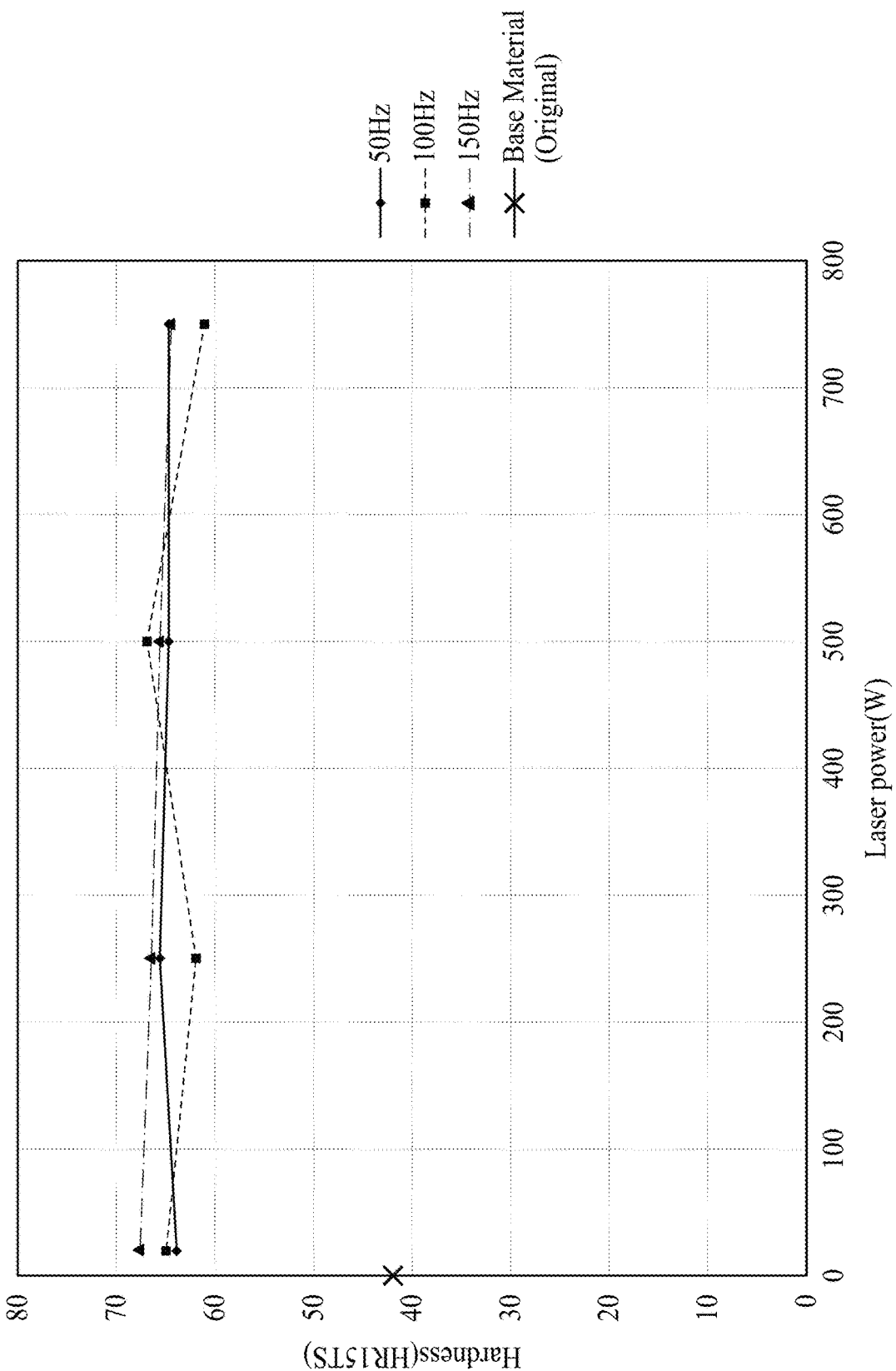
FIG. 5 is a diagram showing a relationship between a hardness of a base material and a power of a laser beam at different scanning frequencies, in accordance with some embodiments of the present disclosure.

Referring to FIG. 2A and FIG. 5, FIG. 5 is a diagram showing a relationship between a hardness of a base material and a power of a laser beam at different scanning frequencies, in accordance with some embodiments of the present disclosure. The formation of the diamond-like carbon layer 206D (shown in FIG. 2B and FIG. 2C) in the treated portion 206 can be observed by the difference of hardness prior to and subsequent to the laser treatment. The treated portion 206 formed by laser treatment has a greater hardness than the untreated portion 205 of the base material 204. Under the American Society for Testing and Materials (ASTM) E18-17 Standard Test Methods for Rockwell Hardness of Metallic Materials, the untreated portion 205 of the base material 204 has a hardness of around 41 (under HR15TS), while the laser treatment can raise the hardness of the treated portion 206 to at least 60 (under HR15TS). It is therefore shown that the laser treatment increases the hardness of the top surface 204T of the base material 204 with the formation of the diamond-like carbon layer 206I) (shown in FIG. 2B and FIG. 2C). It should be noted that the base material 204 comprised of other materials may also be hardened by laser treatment. A greater hardness of a surface may alleviate the effect of forces or stresses applied to the surface, as the interactions between the molecules on the surface are stronger. Therefore the issues of of peeling and/or secondary dust can be alleviated.

TABLE 1

| Sample | Power (W) | Scanning Frequency (Hz) | Pulse Frequency (KHz) | Volume Resistivity ($\Omega$-m) |
| --- | --- | --- | --- | --- |
| 1 | 20 | 55 | 40 | $7.3341 * 10^{-3}$ |
| 2 | 250 | 50 | 40 | $7.5140 * 10^{-3}$ |
| 3 | 500 | 50 | 40 | $7.0979 * 10^{-3}$ |
| 4 | 750 | 50 | 40 | $7.3863 * 10^{-3}$ |
| 5 | 20 | 105 | 40 | $7.3704 * 10^{-3}$ |
| 6 | 20 | 180 | 40 | $7.1966 * 10^{-3}$ |
| 7 | 250 | 100 | 40 | $7.1155 * 10^{-3}$ |
| 8 | 250 | 150 | 40 | $7.1689 * 10^{-3}$ |
| 9 | 250 | 150 | 18 | $7.1342 * 10^{-3}$ |
| 10 | 250 | 150 | 30 | $6.9776 * 10^{-3}$ |
| 11 | 500 | 100 | 40 | $6.9625 * 10^{-3}$ |
| 12 | 500 | 150 | 40 | $6.9262 * 10^{-3}$ |
| 13 | 500 | 150 | 18 | $7.0494 * 10^{-3}$ |
| 14 | 500 | 150 | 30 | $6.9609 * 10^{-3}$ |
| 15 | 750 | 100 | 40 | $6.9650 * 10^{-3}$ |
| 16 | 750 | 150 | 40 | $6.9295 * 10^{-3}$ |
| 17 | 750 | 150 | 18 | $6.9454 * 10^{-3}$ |
| 18 | 750 | 150 | 30 | $7.0637 * 10^{-3}$ |
| Base Material (Original) | 0 | 0 | 0 | $1.6856 * 10^{-3}$ |

Figure 6A:
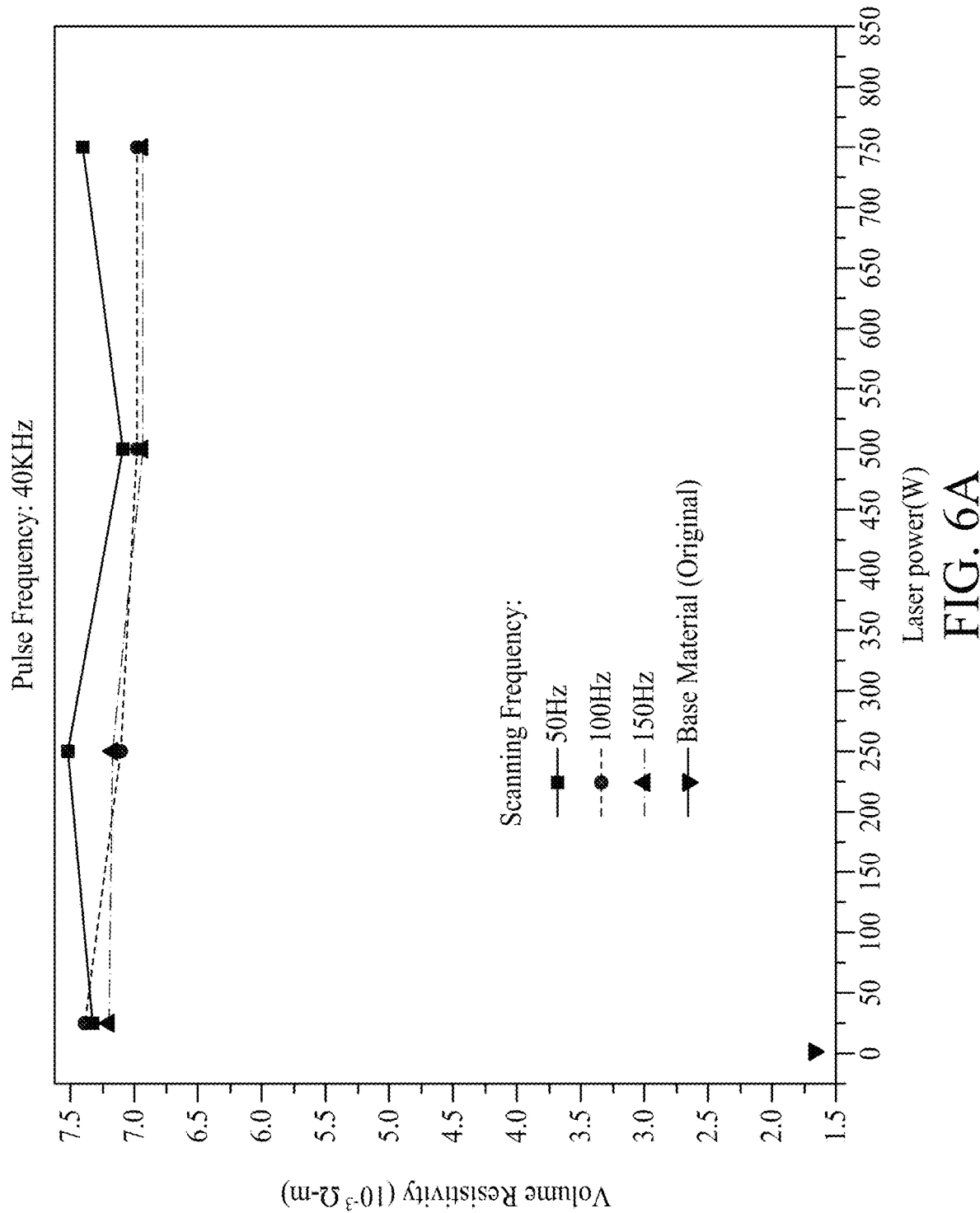
FIG. 6A is a diagram showing a relationship between a volume resistivity of a base material and a power of a laser beam at different scanning frequencies, in accordance with some embodiments of the present disclosure.
Figure 6B:
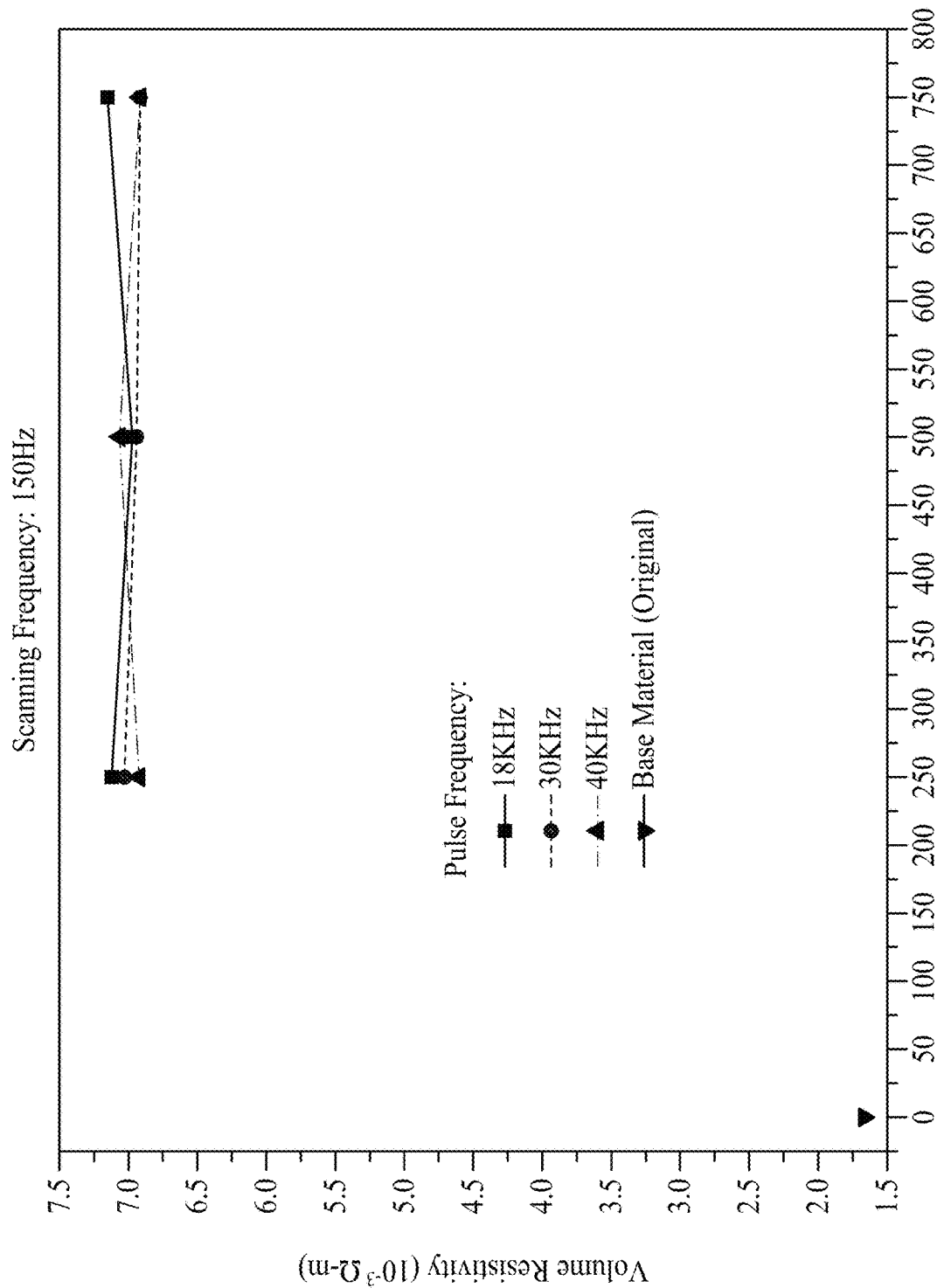
FIG. 6B is a diagram showing a relationship between a volume resistivity of a base material and a power of a laser beam at different pulse frequencies, in accordance with some embodiments of the present disclosure.

Referring to FIG. 2A, FIG. 6A, FIG. 6B, and Table 1, Table 1 is a table showing a volume resistivity of a base material subsequent to laser treatment with different selected parameters, FIG. 6A is a diagram showing a relationship between a volume resistivity of a base material and a power of a laser beam at different scanning frequencies, and FIG. 6B is a diagram showing a relationship between a volume resistivity of a base material and a power of a laser beam at different pulse frequencies, in accordance with some embodiments of the present disclosure. The formation of the diamond-like carbon layer 206D (shown in FIG. 2B and FIG. 2C) in the treated portion 206 can be further observed by the difference of a resistivity of the base material 204 prior to and subsequent to the laser treatment. As shown in Table 1, after the base material 204 is subjected to the laser treatment under various conditions (e.g., a power of the laser beam 203, a scanning frequency of the laser beam 203, and a pulse frequency of the laser beam 203), a volume resistivity of a predetermined portion of the base material 204 may be increased to at least 300% or 400% of its previous level, or may be increased from around $1.6856*10^{-3}$ $\Omega$-m to at least $6.0*10^{-3}$ $\Omega$-m or at least $6.9*10^{-3}$ $\Omega$-m. In some embodiments, a sheet resistivity of a predetermined layer from the base material can also be observed. The sheet resistivity (expressed in $\Omega$/sqr) of the treated portion 206 may be greater than that of the untreated base material 204. It should be noted that a base material 204 comprising other materials may also have its resistivity increased by laser treatment. The elevated resistivity above a predetermined value illustrates that an amount of the diamond-like carbon layer 206D is adequate.

TABLE 2

| Composition | C | O | Total |
| --- | --- | --- | --- |
| Base material (Original) | 97.9% | 2.1% | 100% |
| Sample 1 | 98.9% | 1.10% | 100% |
| Sample 2 | 98.97% | 1.03% | 100% |
| Sample 3 | 98.96% | 1.04% | 100% |

Referring to FIG. 2A and Table 2. Table 2 shows differences between composition of a surface area of a base material prior to a laser treatment ("Original") and subsequent to a laser treatment for each of three different test samples (aligned to the conditions provided in relation to FIG. 3B and FIG. 3C), in accordance with some embodiments of the present disclosure. In the embodiments where the base material 204 includes carbon and the contamination, impurity, foreign substance, or dust includes oxide, a difference of the composition of a predetermined surface area of a base material 204 prior to and subsequent to laser treatment can be observed. Subsequent to laser treatment, a weight percentage of oxygen of a predetermined surface area of the base material 204 is decreased while a weight percentage of carbon of a predetermined surface area of the base material 204 is increased. In some embodiments, a weight percentage of oxygen can be decreased to under 1.5%, or can be decreased by as much as 0.1% or by as much as 99.99%, such as by 0.1%, 0.5%, 1%, 5%, 10%, 20%, 30%, 40%, 50%, 60%, 70%, 80%, 90%, 99%, 99.9% or 99.99%. In some embodiments, a weight percentage of carbon can be increased to be above 98%, or can be increased by 0.01% to 10%, such as by 0.01%, 0.05%, 0.1%, 0.5%, 1%, 2%, 5%, or 10%. In some embodiments, the increase of the weight percentage of carbon and the reduction of the weight percentage of oxygen results from the formation of the diamond-like carbon layer 206D (shown in FIG. 2B and FIG. 2C) and the substantial removal of contamination, impurity, foreign substance, or dust originally adhered to the base material 204. In some embodiments, the composition of a surface area of the base material 204 can be observed by an energy dispersive spectrometer (EDS).

Figure 7:
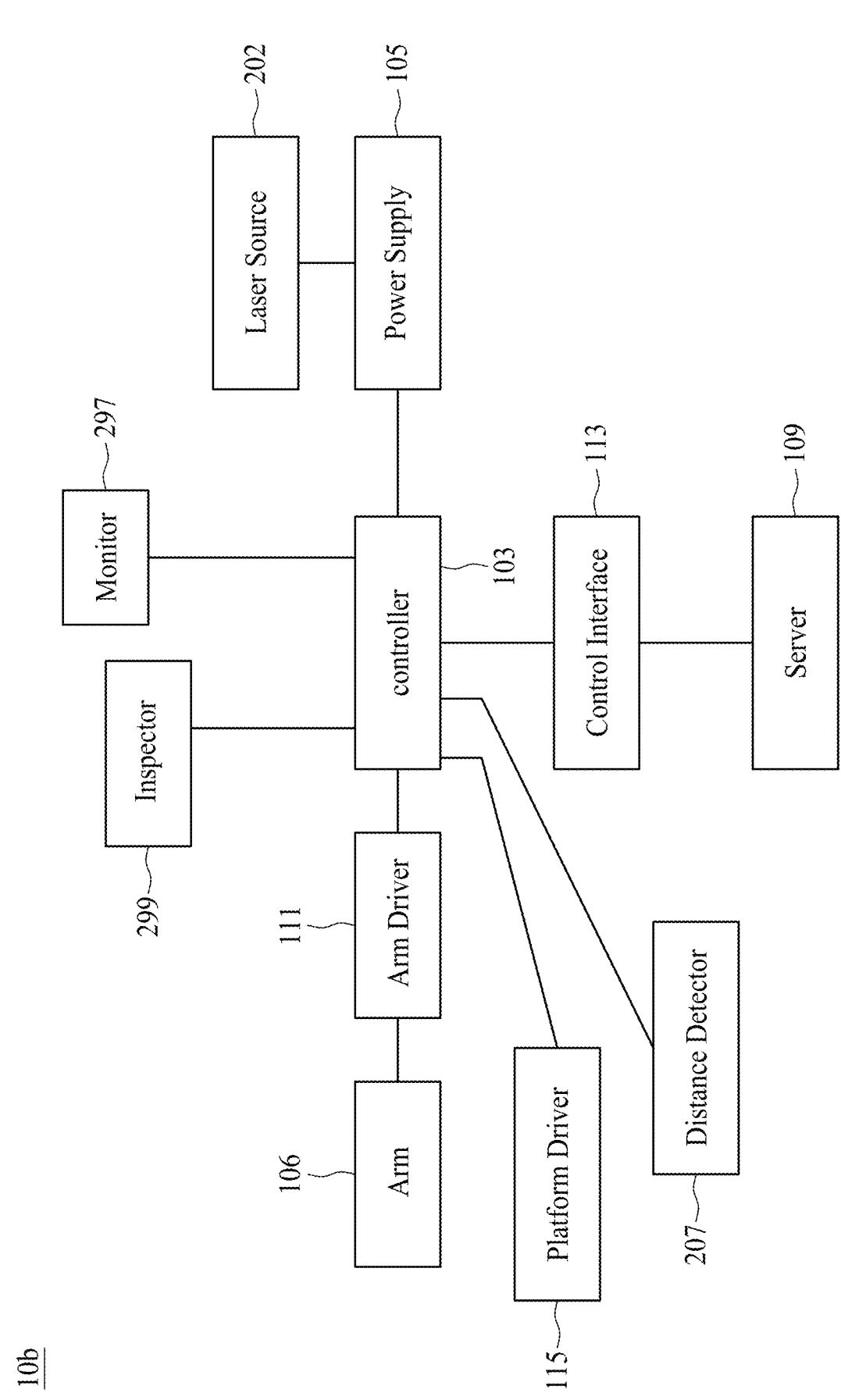
FIG. 7 is a schematic drawing illustrating an apparatus for treating a surface of a base material, in accordance with some embodiments of the present disclosure.

Referring to FIG. 2A and FIG. 7, FIG. 7 is a schematic drawing illustrating an apparatus 10*b* for treating a surface of a base material, in accordance with some embodiments of the present disclosure. Note that elements in FIG. 7 that are the same as or similar to their counterparts in FIG. 2A are hereinafter denoted by the same reference numerals, and redundant explanations are omitted. In some embodiments, in order to improve the performance of the laser treatment, parameters such as a power of the laser beam 203, a scanning frequency of the laser beam 203, and/or a pulse frequency of the laser beam 203 can be set to be in a desirable range by a controller 103 connected to the laser source 202 for adjusting the parameters. The controller 103 may include memory (not shown) for information storage.

In order to control the power of the laser beam 203, the controller 103 controls a power supply 105 to adjust a power supplied to the laser source 202. The controller 103 can therefore control the power of the laser beam 203 to be in a range from about 100 W to about 1,000 W, or any value and ranges mentioned in FIG. 3A to FIG. 3C, such as a level of power of 100 W, 150 W, 200 W, 250 W, 300 W, 350 W, 400

W, 450 W, 500 W, 550 W, 600 W, 650 W, 700 W, 750 W, 800 W, 850 W, 900 W, 950 W, or 1000 W, or within a range from about 250 W to about 750 W, within a range from about 250 W to about 500 W, within a range from about 500 W to about 750 W, or the like. Similarly, the controller 103 controls a pulse frequency of the laser beam 203 to be in a range from about 10 KHz to about 50 KHz, such as 10 KHz, 20 KHz, 30 KHz, 40 KHz, 50 KHz, or any value in between.

In some embodiments, the scanning frequency of the laser beam 203 can be controlled by a relative movement between the laser source 202 and the base material 204. As previously discussed in reference to FIG. 2A, at least one of the platform 201 supporting the base material 204 and the laser source 202 is movable. A scanning frequency of the laser beam 203 in a predetermined area may set to be in a range from about 1.00 Hz to 1,000 Hz, or even higher. For example, the scanning frequency can be 100 Hz, 150 Hz, 200 Hz, 250 Hz, 300 Hz, 350 Hz, 400 Hz, 450 Hz, 500 Hz, 550 Hz, 600 Hz, 650 Hz, 700 Hz, 750 Hz, 800 Hz, 850 Hz, 900 Hz, 950 Hz, 1,000 Hz, or within any range in between.

In some embodiments, the laser source 202 is supported by an arm 106, wherein the controller 103 instructs an arm driver 111 to control the movement and the scanning frequency of the arm 106.

In some embodiments, the controller 103 instructs a platform driver 115 to control the movement of the platform 201, thus the scanning frequency of the laser beam 203 can be controlled. In some embodiments, the controller 103 can obtain a relative movement between the platform 201 and the laser source 202.

The apparatus 10b may optionally include a distance detector 207, wherein the distance detector 207 may detect a distance between the laser source 202 and the top surface 204T of the base material 204 during the laser treatment, as the distance detector can provide the distance detected to the controller 103. In some embodiments, the controller 103 instructs the arm 106 and/or the platform 201 to control a distance between the laser source 202 and the top surface 204T to be in a range from about 1 cm to about 1 m, wherein the distance less than 1 cm may cause damage to the laser source 202 by ejected particles, and the distance greater than 1 m may significantly reduce the accuracy and/or efficiency of radiation. In some embodiments, the distance is in a range from about 1 cm to about 6 cm. In some embodiments, the distance is in a range from about 1 cm to about 20 cm. In some embodiments, the distance is in a range from about 6 cm to 1.00 cm. In some embodiments, the adjustment of the distance is related to a configuration of the apparatus 10b and a power of the laser beam 203, wherein a greater distance may require a greater power level of the laser beam 203.

In some embodiments, a monitor 297 is disposed in the chamber 200, wherein the monitor 297 can provide information related to an environment of the chamber 200 to the controller 103, which may include processing pressure, temperature, humidity, and suction pressure, so that the controller 103 can adjust the environment of the chamber 200. In some embodiments, the monitor 297 can detect temperature at predetermined locations of the apparatus 10b, and a cooling system or a shutdown mechanism of the apparatus 10b can prevent temperature from being elevated to an intolerable value.

In some embodiments, the apparatus 10b optionally includes an inspector 299 to inspect a property of a surface of the base material 204. As previously discussed in reference to FIG. 3A to FIG. 7, the property may include a volume resistivity of the base material 204, a sheet resistivity of a predetermined portion (e.g., a top surface) of the base material 204, a hardness of the surface of the base material 204, a roughness of the surface of the base material 204, a composition of the base material 204, or the like. The information of at least one of the above-mentioned properties inspected by the inspector 299 can be transmitted and processed by the controller 103, so that a parameter, including a power of the laser beam 203 or a pulse frequency of the laser beam 203, can be adjusted in accordance with the inspected property. Such observations of the properties of the base materials 204 can be used to improve the performance of the laser treatment.

In some embodiments, the inspector 299 may include a hardness tester to inspect a hardness of the surface of the base material 204. If a hardness of the surface of the base material 204 does not reach a predetermined value, then the controller 103 may elevate the power of the laser beam 203. In some embodiments, the predetermined value is at least 60 (under HR15TS), as previously discussed in reference to FIG. 5.

In some embodiments, the inspector 299 includes an optical device to inspect a roughness of the surface of the base material 204. The roughness and the smoothness indicates if the formation of the diamond-like carbon layer 206D is proper, wherein an adhering attraction between the base material 204 and the contaminants is negatively related to a roughness of a treated surface. If a roughness of the surface of the base material 204 does not meet a required threshold, then the controller 103 may elevate the power of the laser beam 203 so that the roughness can meet requirements.

In some embodiments, the inspector 299 includes an electrical tester for inspecting resistivity, wherein the resistivity indicates the amount of diamond-like carbon formed. If a resistivity of the surface of the base material 204 does not reach a predetermined value, then the controller 103 may elevate the power of the laser beam 203 so that an adequate amount of the diamond-like carbon is formed. As previously discussed in reference to FIG. 6A, FIG. 6B and Table 1, a volume resistivity of a predetermined portion of the base material 204 may be increased to at least 300% or 400% of the previous value, or may be increased to at least $6.0*10^{-3}$ Ω-m or at least $6.9*10^{-3}$ Ω-m.

In some embodiments, the inspector 299 may include a composition analyzer, such as an energy dispersive spectrometer (EDS), for detecting changes in the composition of a predetermined surface area of the base material during laser treatment. Such changes in the composition may indicate whether contaminants are effectively removed and/or a proper amount of diamond-like carbon is formed. For example, if a weight percentage of oxygen of a predetermined surface area of the base material 204 is greater than a predetermined value, or if a weight percentage of carbon of a predetermined surface area of the base material 204 is less than a predetermined value subsequent to the laser treatment, then the controller 103 may elevate the power of the laser beam 203. In some other embodiments, if a reduction of a weight percentage of oxygen of a predetermined surface area of the base material 204 is less than a predetermined value, or if an increase of a weight percentage of carbon of a predetermined surface area of the base material 204 is less than a predetermined value during the laser treatment, then the controller 103 may elevate the power of the laser beam 203. For example, as previously discussed in reference to Table 2, a weight percentage of oxygen can be decreased to under 1.5%, or can be decreased by up to 0.1% or by up to 99.99%, such as by 0.1%, 0.5%, 1%, 5%, 10%, 20%, 30%, 40%, 50%, 60%, 70%, 80%, 90%, 99%, 99.9% or 99.99%. In some embodiments, a weight percentage of carbon can be increased to be above 98%, or can be increased by 0.01% to 10%, such as by 0.01%, 0.05%, 0.1%, 0.5%, 1%, 2%, 5%, or 10%.

In some embodiments, the inspection of the above-mentioned properties by the inspector 299 is performed in-situ so that a real time adjustment of the parameters can be performed. In some other embodiments, the inspector 299 performs an inspection after the laser treatment is complete, and the above-mentioned parameters can be adjusted to improve the yield rate of other base materials 204 being treated subsequently.

In some embodiments, the inspector 299 may inspect a distribution of contaminants, defects or dust on the base material 204 by an optical device or by a tape test, so that other laser treatments having different power levels can be sequentially or separately performed. In some embodiments, if an amount or a density of contaminants, defects or dust within a region is greater than a predetermined value, the controller 103 may elevate the power of the laser beam 203 to treat the region. In some embodiments, the region may be independently treated multiple times. In some other embodiments, the entire top surface 204T of the base material 204 is thereby treated with a laser beam having a higher power level, and/or treated multiple times.

In some embodiments, the apparatus 10b optionally includes a control interface 113 connected to the controller 103. The control interface 113 may optionally include a display to show the above-mentioned parameters (i.e., a power of the laser beam 203 or a pulse frequency of the laser beam 203), properties of the base materials 204, information related to the environment of the chamber 200, and other parameters related to the apparatus 10b, so that a user can conveniently monitor the status of the laser treatment. The control interface 113 may be able to receive an instruction and transmit the instruction to the controller 103. In some embodiments, a user manually instructs the controller 103 through the display of the control interface 113 to adjust parameters (i.e., a power of the laser beam 203, or a pulse frequency of the laser beam 203) and/or the environment of the chamber 200. In some other embodiments, a user can instruct the controller 103 through the control interface 113 via a remote terminal. In some other embodiments, the instruction can optionally be automatically or semi-automatically provided by a server 109, which may include algorithms or automatic instructions to control the controller 103, wherein the adjustments are executed automatically or semi-automatically.

The controller 103, the control interface 113, and/or the server 109 can be implemented by software such that the foregoing methods disclosed herein can be performed automatically or semi-automatically. For a given computer, the software routines can be stored on a storage device, such as a permanent memory. Alternately, the software routines can be machine executable instructions stored using any machine readable storage medium, such as a diskette, CD-ROM, magnetic tape, digital video or versatile disk (DVD), laser disk, ROM, flash memory, etc. The series of instructions can be received from a remote storage device, such as a server on a network. The present invention can also be implemented in hardware systems, microcontroller unit (MCU) modules, discrete hardware or firmware.

The present disclosure provides an apparatus to radiate a high-powered laser beam and a method for treating a surface of a base material by the high-powered laser beam. Compared to a low-powered laser beam, a high-powered laser beam can be used to avoid the generation of substantial secondary dust ejected from the base material and remove contamination or dust, while forming a layer with lower adhesion attraction to reduce the contamination or dust adhering to the surface, thus substantially improving the removal of contamination or dust. In some embodiments, the layer with low adhesion attraction includes diamond-like carbon, which has a smoother and harder surface that can facilitate the removal of contamination or dust from the surface, while induction of dust from the surface is also reduced. The present disclosure provides an apparatus with the configuration of the controller, the inspector, the server and/or the control interface to improve the performance of the laser treatment, wherein such configuration can provide improved, more accurate control of parameters of the laser treatment.

Some embodiments of the present disclosure provide a method of treating a surface of a base material, including providing the base material and performing a laser treatment by using a laser source to radiate a laser beam onto the surface of the base material, wherein a power of the laser beam is in a range from about 100 W to about 1,000 W.

Some embodiments of the present disclosure provide an apparatus for treating a surface of a base material, including a platform, configured to support the base material, and a laser source, disposed above the platform, wherein the laser source is configured to emit a laser beam onto the surface of the base material, and a power of the laser beam is in a range from about 100 W to about 1,000 W.

Some embodiments of the present disclosure provide an apparatus for treating a surface of a base material, including a platform, configured to support the base material; a laser source, disposed above the platform, wherein the laser source is configured to radiate a laser beam onto the surface of the base material; an inspector, disposed above the base material, wherein the inspector is configured to inspect a property of the surface of the base material; and a controller, coupled to the laser source and the inspector, and configured to adjust a parameter of the laser beam in accordance with the properties of the surface of the base material inspected by the inspector.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for treating a surface of a base material, comprising:
   providing a carbon-based material in a chamber; and
   performing a laser treatment to locally fuse a surface of the carbon-based material by using a laser source to radiate a laser beam onto the surface of the carbon-based material, thereby forming a diamond-like carbon layer at the surface of the carbon-based material after cooling down the carbon-based material, increasing a weight percentage of carbon of a portion of the surface to be above 98%, and reducing an amount of dust over the surface of the carbon-based material, wherein a power of the laser beam is in a range from 100W to 1,000W.

2. The method of claim 1, wherein the carbon-based material comprises graphite.

3. The method of claim 1, further comprising inspecting a property of the surface of the carbon-based material, wherein the property includes at least one of resistivity, hardness, roughness, and composition of the carbon-based material.

4. The method of claim 3, further comprising adjusting the power of the laser beam in accordance with the property of the surface of the carbon-based material.

5. The method of claim 1, further comprising inspecting an amount of diamond-like carbon formed over the carbon-based material.

6. The method of claim 1, further comprising reducing a weight percentage of oxygen of a surface area of the carbon-based material by removing a plurality of oxide-containing particles on the surface of the carbon-based material via the laser treatment.

7. An apparatus for treating a surface of a base material, comprising:
   a platform, configured to support a carbon-based material; and
   a laser source, disposed above the platform, wherein the laser source is configured to emit a laser beam onto a surface of the carbon-based material for locally fusing the carbon-based material at the surface, forming a diamond-like carbon layer at the surface of the carbon-based material after cooling down the carbon-based material, and reducing an amount of dust over the surface of the carbon-based material, wherein the laser source is configured to increase a weight percentage of carbon of a portion of the surface to be above 98%, and a power of the laser beam is in a range from 100W to 1,000W.

8. The apparatus of claim 7, wherein a pulse frequency of the laser beam is in a range from 10 KHz to 50 KHz.

9. The apparatus of claim 7, further comprising an optical distance detector configured to measure a distance between the laser source and the carbon-based material.

10. The apparatus of claim 7, further comprising an inspector configured to inspect an amount of diamond-like carbon formed over the carbon-based material.

11. The apparatus of claim 7, further comprising a dust collector configured to collect particles ejected from the surface of the carbon-based material.

12. An apparatus for treating a surface of a base material, comprising:
    a platform, configured to support a carbon-based material, wherein the carbon-based material comprises natural graphite, artificial graphite, carbon fiber, single-walled carbon nanotubes (SWCNTs), multi-walled carbon nanotubes (MWCNTs), graphene, or allotropes of carbon;
    a laser source, disposed above the platform, wherein the laser source is configured to radiate a laser beam on a surface of the carbon-based material for locally fusing the carbon-based material at the surface and forming a diamond-like carbon layer at the surface of the carbon-based material after cooling down the carbon-based material, and reducing an amount of dust over the surface of the carbon-based material, and the laser source is configured to increase a weight percentage of carbon of a portion of the surface to be above 98%;
    an inspector, disposed above the carbon-based material, wherein the inspector is configured to inspect a volume resistivity of the carbon-based material; and
    a controller, coupled to the laser source and the inspector, and configured to adjust a parameter of the laser beam in accordance with the volume resistivity of the surface of the carbon-based material inspected by the inspector.

13. The apparatus of claim 12, wherein the platform is disposed in a low-pressure chamber.

14. The apparatus of claim 13, wherein the low-pressure chamber comprises a dust collector, configured to collect particles ejected from the surface of the carbon-based material.

15. The apparatus of claim 12, further comprising a power supply coupled to the laser source, and configured to provide a power signal to the laser source.

16. The apparatus of claim 12, wherein the parameter of the laser beam includes at least one of a power of the laser beam and a pulse frequency of the laser beam.

17. The apparatus of claim 13, further comprising a control interface configured to receive an instruction and transmit the instruction to the controller for controlling an environment of the low-pressure chamber.

18. The apparatus of claim 12, further comprising an arm configured to adjust at least one of a position of the laser source and a scanning frequency of the laser beam.

* * * * *